(12) United States Patent
Takahashi

(10) Patent No.: US 9,259,970 B2
(45) Date of Patent: Feb. 16, 2016

(54) PNEUMATIC TIRE FOR HEAVY LOAD

(75) Inventor: Hiroki Takahashi, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 269 days.

(21) Appl. No.: 13/992,395

(22) PCT Filed: Dec. 21, 2011

(86) PCT No.: PCT/JP2011/079675
§ 371 (c)(1),
(2), (4) Date: Jun. 7, 2013

(87) PCT Pub. No.: WO2012/090825
PCT Pub. Date: Jul. 5, 2012

(65) Prior Publication Data
US 2013/0248075 A1  Sep. 26, 2013

(30) Foreign Application Priority Data
Dec. 29, 2010 (JP) .................. 2010-294564

(51) Int. Cl.
*B60C 9/18* (2006.01)
*B60C 1/00* (2006.01)
*B60C 9/28* (2006.01)

(52) U.S. Cl.
CPC ... *B60C 9/18* (2013.01); *B60C 1/00* (2013.01); *B60C 9/28* (2013.01); *B60C 9/1835* (2013.04); *B60C 2001/0075* (2013.04); *B60C 2009/1842* (2013.04); *B60C 2009/1864* (2013.04); *Y10T 152/1081* (2015.01)

(58) Field of Classification Search
CPC .......... B60C 9/18; B60C 9/1835; B60C 9/28; B60C 2001/0075; B60C 2009/2064; B60C 2009/1842; Y10T 152/1081

USPC ........................................................ 152/532
See application file for complete search history.

(56) References Cited

U.S. PATENT DOCUMENTS 4,086,948 A * 5/1978 Suzuki et al. ................. 152/541
4,273,177 A * 6/1981 Nybakken .................... 152/528
(Continued)

FOREIGN PATENT DOCUMENTS

| EP | 0 780 248 A1 | 6/1997 |
|---|---|---|
| JP | 6-016012 A | 1/1994 |
| JP | 9-183304 A | 7/1997 |
| JP | 9-300911 A | 11/1997 |
| JP | 2000-025413 A | 1/2000 |

(Continued)

OTHER PUBLICATIONS

International Search Report issued in PCT/JP2011/079675, mailed on Mar. 13, 2012.

*Primary Examiner* — Richard Crispino
*Assistant Examiner* — Kendra Ly
(74) *Attorney, Agent, or Firm* — Birch Stewart Kolasch & Birch, LLP

(57) ABSTRACT

A belt cushion disposed between an tire-axis-direction end of a belt layer and a carcass comprises an outer layer, an interlayer, and an inner layer which are arranged in this order inwardly in the tire-radial-direction from the tire-axis-direction end of the belt layer. The inner layer and outer layer are made of a rubber composition B having complex modulus $E^*b$ and loss tangent $\tan \delta b$. The interlayer is made of a rubber composition C having complex modulus $E^*c$ being substantially the same as the complex modulus $E^*b$ and having loss tangent $\tan \delta c$ being smaller than the loss tangent $\tan \delta b$.

4 Claims, 2 Drawing Sheets

(56) References Cited

U.S. PATENT DOCUMENTS

| | | | |
|---|---|---|---|
| 5,215,612 A * | 6/1993 | Motomura et al. | 156/130.7 |
| 6,536,496 B1 * | 3/2003 | Bondu | 152/532 |
| 2007/0102088 A1 * | 5/2007 | Hayashi et al. | 152/532 |
| 2010/0243115 A1 | 9/2010 | Wada | |
| 2010/0314018 A1 * | 12/2010 | Bondu | 152/556 |

FOREIGN PATENT DOCUMENTS

| | | | |
|---|---|---|---|
| JP | 2004-099804 A | 4/2004 | |
| JP | 2007-131110 A | 5/2007 | |
| JP | 2010-100263 A | 5/2010 | |
| WO | WO 2009/060647 A1 | 5/2009 | |
| WO | WO 2011036893 A1 * | 3/2011 | B60C 9/22 |

* cited by examiner

PNEUMATIC TIRE FOR HEAVY LOAD

TECHNICAL FIELD

The present invention relates to a pneumatic tire for heavy load, peculiarly to an internal structure of a shoulder portion comprising a belt cushion being capable of reducing rolling resistance while keeping durability.

BACKGROUND OF THE INVENTION

During recent years, along with the gradual warming of the earth caused by emission of carbon dioxide, people compellingly need for reduction of emissions of car exhaust and carbon dioxide. There is therefore a greater need for low fuel consumption of a car. And a tire is urgently required to save its weight and to reduce its rolling resistance as much as possible.

That rolling resistance reduction is also demanded not only in a tire for a passenger car but also in a heavy duty tire for a truck, bus and the like. In particular, it is important to reduce the rolling resistance of a tire for a heavy truck that runs on a pavement at high speed.

A traditional measure for rolling resistance reduction of the tire was to improve a tread rubber. However, the tread rubber was an influential member on wear resistance and grip property. Therefore, it was at the end on a technical level to reduce the rolling resistance while keeping the wear resistance and the grip property.

This created a need to reduce the rolling resistance of not only the tread rubber but also other neglected tire members.

In a general way, a pneumatic tire for heavy load is provided in a tread portion with a belt layer of plural layers (plies) made of a belt cord such as a steel cord. And, there is a belt cushion between the tire-axis-direction end of the belt layer and a carcass.

The tire-axis-direction end of the belt layer is disposed in a shoulder portion where the tread portion and the sidewall portion intersect one another. On the edge of the belt layer while the car running, a large load subjects; and there arises large stress on a stump of a rigid belt cord.

Therefore, the belt cushion needs to have abilities of relaxing a stress, preventing a separation between the belt cord and the rubber, and reinforcing a space between the tire-axis-direction end of the belt layer and the carcass sufficiently. Lack of this reinforcement causes increasing a deformation amount of the edge of the belt layer and deteriorating notably the durability.

Patent Document 1 discloses a preferable rubber composition for a belt cushion. This rubber composition comprises rubber component, carbon black, sulfur, vulcanization accelerator and the like in a specified compound ratio so as to excel in reinforcement property and improve fuel consumption.

STATE OF ART REFERENCE

Patent Document

Patent Document 1: Japanese Unexamined Patent Application Publication No. 2004-099804.

SUMMARY OF THE INVENTION

Problems to be Solved by the Invention

However, even if employing the rubber composition disclosed in Patent Document 1 into a belt cushion, there are some limitations to more fuel consumption and reinforcement property in a good balance.

It is therefore, in view of the above-mentioned problems, an object of the present invention to provide a pneumatic tire for heavy load excels in the fuel consumption and the reinforcement property (durability of the shoulder portion) by using plural layers of a belt cushion made of different rubber compositions containing various compositions.

Means for Solving the Problems

In the invention according to claim 1, a pneumatic tire for heavy load comprises a carcass extending from a tread portion through a sidewall portion to a bead portion, a belt layer disposed on the radially outside of the carcass and inside the tread portion, and a belt cushion disposed between the tire-axis-direction end of the belt layer and the carcass. The belt cushion comprises at least three layers an outer layer, an interlayer, and an inner layer which are arranged in this order inwardly from the tire-axis-direction end of the belt layer in the tire-radial-direction. The outer layer and the inner layer are made of a rubber composition B having complex modulus $E^*b$ and loss tangent tan $\delta b$. The interlayer is made of a rubber composition C having complex modulus $E^*c$ being substantially the same as the complex modulus $E^*b$ and having loss tangent tan $\delta c$ being smaller than the loss tangent tan $\delta b$.

In the invention according to claim 2, the rubber composition B of the outer layer and the inner layer includes rubber reinforcing filler ranging from 35 to 45 parts by mass with respect to rubber component 100 parts by mass, and the loss tangent tan $\delta b$ is in a range of from 0.035 to 0.045. The rubber composition C of the interlayer includes rubber reinforcing filler of less than 35 parts by mass with respect to rubber component 100 parts by mass, and the loss tangent tan $\delta c$ is less than 0.035. A difference between the rubber reinforcing filler quantity of the rubber composition B and the rubber reinforcing filler quantity of the rubber composition C is not less than 5 parts by mass.

In the invention according to claim 3, the belt cushion is formed in a four-layer structure where the belt cushion is provided on the radially inside of the inner layer with an innermost layer made of a rubber composition D disposed between the inner layer and the carcass. The tire-axis-direction end of the belt layer is covered with an edge cover made of a rubber composition A.

In the invention according to claim 4, a thickness BC1 of the outer layer measured from the tire-axis-direction end of the belt layer toward the radially inside of the tire is in a range of from not less than 0.5 times to not more than 3.5 times the cord diameter of the cord of the belt ply. A thickness BC2 of the inner layer measured along the normal line extending from the tire-axis-direction end of the belt layer to the carcass is in a range of from not less than 1.0 times to not more than 6.0 times the cord diameter of the carcass cord of the carcass ply adjacent to the inner layer.

In the description of the present application and claims, unless otherwise noted, values of loss tangent Tan $\delta$ and complex modulus $E^*$ of the rubber member are measured by use of a viscoelastic spectrometer under a condition of a temperature of 70 degrees c, a frequency of 10 Hz, an initial tension strain of 10%, and an amplitude of dynamic strain of plus/minus 2%.

In this description, unless otherwise noted, each dimension of portions of the tire including the above-mentioned dimensions is measured under the standard state of the tire mounted on a standard rim inflated to a standard pressure and loaded with no load.

The "standard rim" means a rim officially approved for each tire by a standard including one on which the tire is based. The standard rim is a "standard rim" in the case of JATMA, a "Design Rim" in the case of TRA, and a "Measuring Rim" in the case of ETRTO.

The "standard internal pressure" means an air pressure officially approved for each tire by the standard. The "standard internal pressure" means a maximum air pressure in JATMA, a maximum value described in a table "TIRE LOAD LIMITS AT VARIOUS COLD INFLATION PRESSURES" in the case of TRA, and "INFLATION PRESSURE" in the case Of ETRTO.

A tread width TW is a distance measured between tread edges TE in the axial direction of the tire under the standard state with no load. The tread edges TE are determined as the axially outermost ends in a ground contacting portion under the standard loaded condition.

The "standard loaded condition" means a condition of loading the standard load on the tire under the standard condition.

The "standard tire load" means a load officially approved for each tire by the standard. The standard tire load is maximum load ability in the case of JATMA, a maximum value described in a Table "TIRE LOAD LIMITS AT VARIOUS COLD INFLATION PRESSURES" in the case Of TRA, and a "LOAD CAPACITY" in the case of ETRTO.

Effect of the Invention

In claim 1 of the present invention, the outer layer, the interlayer, and the inner layer of the belt cushion have substantially the same complex modulus. The belt cushion has therefore a uniform hardness in totality and can exert the reinforce efficacy. The loss tangent of the interlayer is smaller than the loss tangent of the outer layer and of the inner layer; and it helps to reduce inside loss of the whole of the belt cushion thereby reducing the rolling resistance of the tire.

In claim 2 of the present invention, values of each loss tangent and its difference are specified; and this allows the rolling resistance reduction and the reinforce efficacy to be more ensured.

In claim 3 according to the present invention, there is an innermost layer made of rubber composition D that is adhesive with a metal cord between the carcass and the inner layer of the belt cushion; this allows adherence property with the belt cushion to improve durability in a case of metal carcass cord.

In claim 4 of the present invention, the thickness BC1 of the outer layer and the thickness BC2 of the inner layer are set to specific numerical value ranges; this allows the reinforce efficacy to be more ensured.

CONFIGURATION FOR EXPLOITATION OF INVENTION

Hereinafter, an embodiment of the present invention will be described with referent to the drawings.

Figure 1:
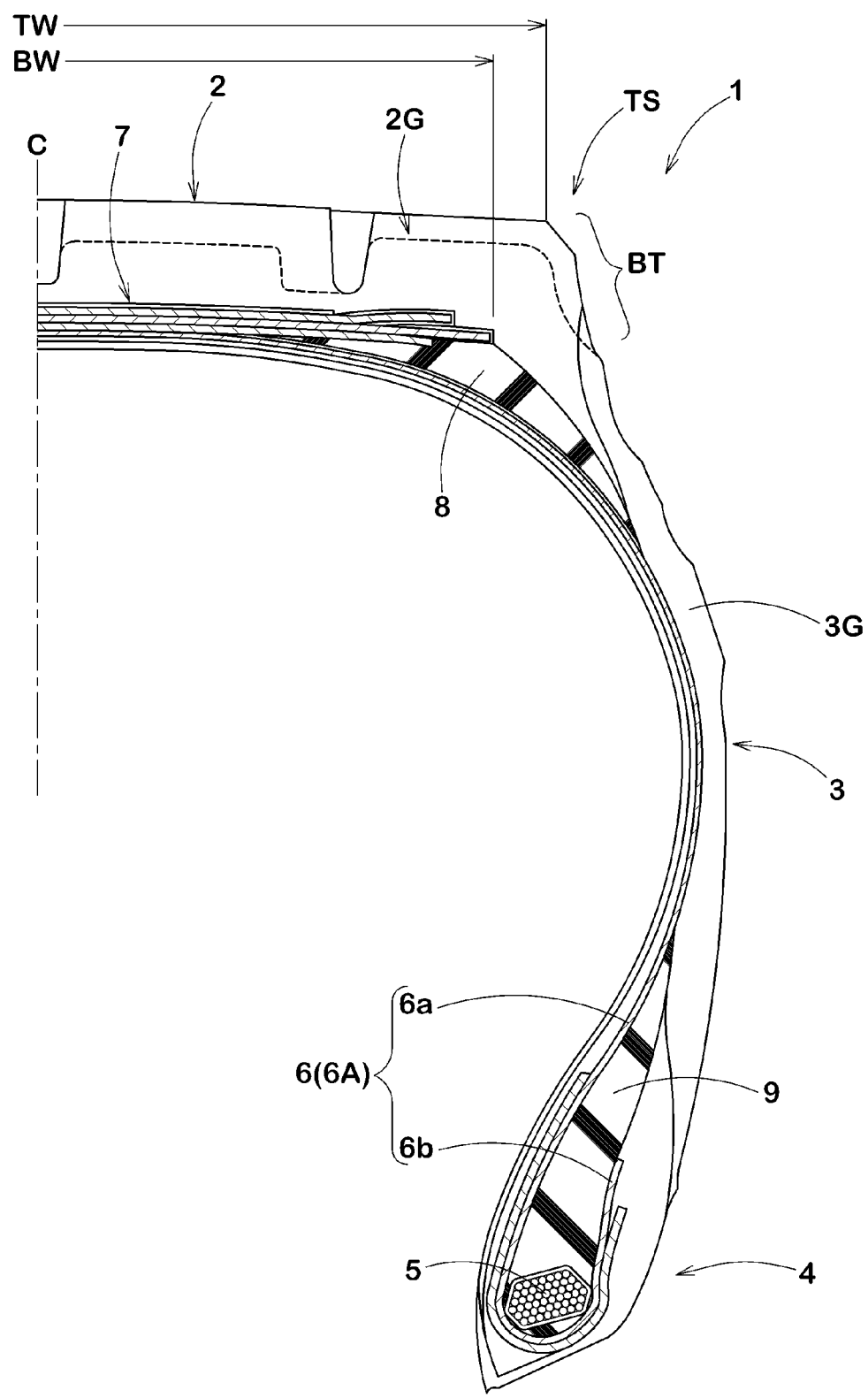
FIG. 1 is a cross-sectional view of a radial tire for a truck and a bus showing an embodiment of a pneumatic tire for heavy load according to the present invention.

As shown in FIG. 1, a pneumatic tire for heavy load 1 according to the present embodiment is formed as a radial tire for a big-size truck and a bus. The tire 1 comprises
 a tread portion 2,
 a sidewall portion 3 extending radially inward from an tire-axis-direction end of the tread portion 2,
 a bead portion 4 disposed in a radially inner end of the sidewall portion 3,
 a bead core 5 disposed inside the bead portion 4,
 a carcass 6 extending from the tread portion 2 through the sidewall portion 3 to each of the bead portions 4, 4,
 a belt layer 7 disposed in a radially outside of the carcass 6 and in the tread portion 2, and
 a belt cushion 8 disposed between each of the tire-axis-direction ends of the belt layer 7 and the carcass 6.

The tread portion 2 is provided on the radially outside of the belt layer with a tread rubber 2G which forms the tread surface. This tread rubber 2G extends over the tire-axis-direction end of the belt layer 7 and radially inside along the axially outer surface of the belt cushion 8, and terminates on the outer surface.

The tread rubber 2G according to the present embodiment is made in a so-called two-layer cap-base structure, where the tread rubber 2G comprises
 a cap rubber 2GC forming the tread surface, and
 a base rubber 2GB disposed on its radially inside.

In the shoulder portion TS according to the present embodiment, the tread surface (or its extended surface) and the outer surface of the sidewall portion 3 (or its extended surface) intersect one another at an angle of from 90 to 120 degrees in the tire meridian section. The shoulder portion TS is formed as a so-called tapered shoulder. The intersecting point of the tread surface and the outer surface of the sidewall portion 3 is chamfered at an angle of about 45 degrees with respect the tread surface. However, the shoulder portion TS may be also formed as a so-called square shoulder where the intersecting portion is not chafered or as a so-called round shoulder where the intersecting portion is an arc-line. An axial groove provided in the tread shoulder region opens in a buttress portion BT.

The sidewall portion 3 is provided in the axially outside of the carcass 6 with a sidewall rubber 3G. This sidewall rubber 3G extends inward and outward in the tire-radial-direction, and the outer end of the sidewall rubber 3G touches the axially outer surface of the tread rubber 2G and extends to the buttress portion BT.

The carcass 6 comprises a single carcass ply 6A comprising a main portion 6a extending from the tread portion 2 through the side wall portion 3 to the bead core 5 of the bead portion 4 and a turned up portion 6b continuing from the main portion 6a and turned up around the bead core 5 from the axial inside to the axial outside of the tire.

For the carcass ply 6A, the following structure may be employed: a structure of the turned up portion 6b turning up outwardly in the tire-radial-direction along the axially outer surface of the bead apex 9 (shown in FIG. 1), and a structure of winding substantially once around the bead core 5 (not shown) and the like. The bead apex 9 is the rubber member that is disposed outside the bead core 5 in the tire-radial-direction and extends from the bead portion 4 to the lower part of the sidewall portion 3 in a tapered manner so as to reinforce this region.

The carcass ply 6A is made of a carcass cord covered with topping rubber. The carcass cord is inclined at an angle of from 75 to 90 degrees with respect to the tire equator. For the carcass cords, a steel cord and an organic fiber cord such as aromatic polyamide, nylon, rayon, polyester may be employed.

The carcass 6 according to the present embodiment is formed of a single carcass ply 6A made of the steel cord from the aspect of weight saving. The steel cord (carcass cord) is inclined at an angle of substantially 90 degrees with respect to the tire equator. The carcass 6 may be also formed of plural carcass plies 6A of organic fiber cord.

Figure 2:
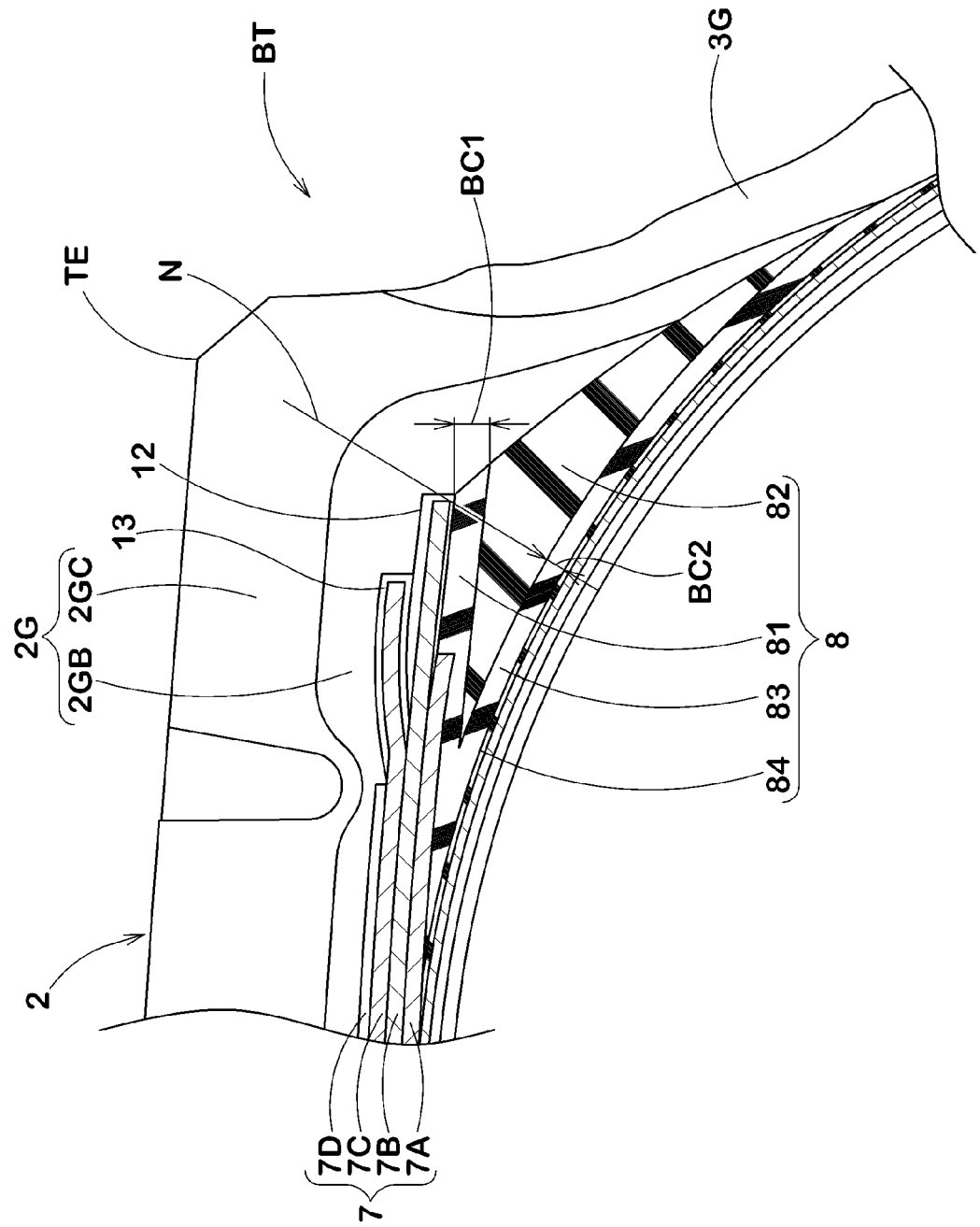
FIG. 2 is an enlarged cross-sectional view of its shoulder portion.

The belt layer 7 is formed of plural belt plies including at least two cross (intersect) plies as shown in FIGS. 1 and 2. The belt layer 7 according to the present embodiment comprises four plies: a first ply 7A, a second ply 7B, a third ply 7C, and a fourth belt ply 7D which are arranged in this order from the carcass 6 toward the tread surface. A axial width BW of the belt layer 7 measured in the axial direction of the tire is set not less than 80% and not more than 95% of the tread width TW in order to reinforce efficiently the overall width of the tread width TW. The belt plies 7A, 7B, 7C, and 7D are made of belt cords (steel cords) covered with rubber; and inside the belt ply, the belt cords are arranged substantially parallel one another.

The belt width BW is defined as a belt ply width that is the widest one in the belt plies. In the present embodiment, the widest belt ply is the second belt ply 7B. The second widest belt ply is the third belt ply 7C, and the width is set to not less than 60% of the belt width BW in order to reinforce the tread portion 2 effectively. The upper limit of the width thereof is not more than 98% of the belt width BW in order to displace the ply ends for preventing stress concentration. Moreover, in the belt layer 7, the width of the innermost first belt ply 7A is smaller than the width of third belt ply 7C, and the width of the outermost fourth belt ply 7D is smaller than the width of the first belt ply 7A in order to displace all the ply ends in the tire axial direction.

The belt cord angle with respect to the tire equator C and the inclining direction are as follows:

Cord of first belt ply 7A: from 40 to 60 degrees;

Cords of second, third, and fourth belt plies 7B, 7C, and 7D: from 10 to 30 degrees;

Cords of second and third belt plies 7B, 7C: the same angle and opposite inclination direction;

First and second belt plies 7A, 7B: the same inclination direction;

Third and fourth belt plies 7C, 7D: the same inclination direction.

The first belt ply 7A is adjacent to a radially outer surface of the crown portion of the carcass 6, and the overall width of the first belt ply 7A extends substantially in parallel with a tread profile. The tread profile is a tread surface profile in a tire meridian section.

The overall width of the second belt ply 7B extends substantially in parallel with a tread profile and is superposed on the first belt ply 7A. The third belt ply 7C is superposed on the second belt ply 7B, but only the tire-axis-direction end of the third belt ply 7C separates from the second belt ply 7B. The separating part is covered with an edge cover 13 made of thin rubber extending radially from the outer surface to the inner surface. Also, only the tire-axis-direction end of the second belt ply 7B is covered with an edge cover 12 made of thin rubber extending radially from the outer surface to the inner surface.

The overall width of the fourth belt ply 7D extends substantially in parallel with a tread profile and is superposed on the third belt ply 7C.

The edge covers 12, 13 according to the present embodiment are preferably arranged at least on the widest belt ply 7B and the second widest belt ply 7C. These edge covers 12, 13 are made of a sheet of rubber composition A.

The rubber composition A contains filler (carbon black) at a comparatively high rate in order to improve reinforce efficacy on the belt cord end of the steel cords. TO improve adhering property with the steel cords, the rubber component of the rubber composition A preferably contains mainly natural rubber, and additionally contains isoprene rubber, also cobalt. This allows the edge covers 12, 13 to cover the steel cord end with reinforce efficacy, to reduce the stress between the adjacent rubber layers while preventing the out of arrangement, and to improve the adhering property. The rubber preferably contains cobalt ranging from 0.5 to 5.0 parts by mass with respect to rubber component 100 parts by mass.

The above-mentioned disposition of the belt layer 7 forms a space tapering toward the tire equator C between the tire-axis-direction end of the belt layer 7 and the carcass 6. In that space, there is a belt cushion 8.

The belt cushion 8 has a structure comprising at least three layers at a position of a tire-axis-direction end of the belt layer 7. More particularly, when viewed along a normal line N extending from the tire-axis-direction end of the belt layer 7 to the carcass 6, the belt cushion 8 comprises at least three layers: an outer layer 81, an interlayer 82, and an inner layer 83. The belt cushion 8 has a flattened substantially triangular cross-sectional shape overall, and the maximum thickness is measured at the axially outer end of the belt layer 7.

The outer layer 81 according to the present embodiment extends axially inward from a little axially outside of the tire-axis-direction end (the widest belt ply end) of the belt layer 7 along the radially inner surface of the belt layer 7 to the axially inner end of the belt cushion 8. The major portion of the outer layer 81 has a substantially uniform thickness as shown in drawings.

More particularly, the outer layer 81 has a thickness BC1 in the tire-axis-direction end of the belt layer 7. The thickness BC1 is substantially uniform to the tire-axis-direction end of the first belt ply 7A. The lower limit of the thickness BC1 is preferably not less than 0.5 times, more preferably not less than 1.0 times the cord diameter of the belt cord; and the upper limit of the thickness BC1 is preferably not more than 3.5 times, more preferably not more than 3.0 times the cord diameter of the belt cord. The tire-axis-direction end of the first belt ply 7A according to the present embodiment, the thickness of the outer layer 81 is set in these ranges. when the belt cord diameter is in a range of from 1.0 to 1.7 mm as a typical case, the thickness BC1 is in a range of about from 1.0 to 3.0 mm, for example.

When the thickness BC1 of the outer layer 81 is less than 0.5 times the cord diameter of the belt cord, it is difficult to keep the reinforce efficacy and the durability. when the thickness BC1 is over 3.5 times of the cord diameter, the outer layer 81 having a large inside loss increases; therefore, it is difficult to achieve the low fuel consumption due to decreasing of the interlayer having relatively-smaller inside loss.

The inner layer 83 according to this embodiment extends along the outer surface of the carcass 6 from a position located more axially outward than the tire-axis-direction end of the belt layer 7 to a position connecting with the outer layer 81. The major portion of the inner layer 83 as shown in drawings has a substantially unique thickness. More particularly, the inner layer 83 is substantially the same in thickness from near the axially outer end (tapered) to the connecting section with the outer layer 81.

The inner layer 83 has a thickness BC2 in measuring along the normal line N. The lower limit of the thickness BC2 is not less than 1.0 times, more preferably not less than 1.2 times the cord diameter of the carcass cord of the carcass ply 6A adjacent to the inner layer 83; and the upper limit is preferably not more than 6.0 times, more preferably not more than 4.2 times the cord diameter. As a typical case, when the carcass cord diameter is in a range of from 0.7 to 1.5 mm, the thickness BC2 is in a range of about from 2.0 to 4.0 mm, for example.

When the thickness BC2 of the inner layer 83 is not more than 1.0 times the carcass cord diameter, it is difficult to keep the reinforce efficacy and durability. when the thickness BC2 is not less than 6.0 times the cord diameter, the inner layer 83 having a large internal loss increases. Therefore, the interlayer having a small internal loss relatively decreases, and it becomes difficult to accomplish the low fuel consumption.

Between the inner layer 83 and the outer layer 81, there is a wedge-shaped interlayer 82 inserted. The interlayer 82 extends toward near the axially outer end of the inner layer 83 while forming the main part of the axially outer surface of the belt cushion 8.

The interlayer 82 extends axially inward in a tapered manner between the inner layer 83 and the outer layer 81. In order to minimize the rolling resistance, the axially inner end of the interlayer 82 terminates at a position located more axially inward than the axially inner end of the second widest belt ply (in the present embodiment, the third belt ply 7C) or more preferably terminates at a position more axially inward than the axially inner end of the third widest belt ply (in the present embodiment, the first belt ply 7A).

The outer layer 81 and the inner layer 83 are made of a rubber composition B having complex modulus $E^*b$ and loss tangent $\tan \delta b$. The interlayer 82 is made of a rubber composition C having complex modulus $E^*c$ and loss tangent $\tan \delta c$. The value of complex modulus $E^*b$ of the outer layer 81 and the inner layer 83 (the rubber composition B) and the value of the complex modulus $E^*C$ of the interlayer 82 (the rubber composition C) are substantantially the same. The loss tangent tan Sc of the interlayer 82 is smaller than the loss tangent $\tan \delta b$ of the outer layer 81 and the inner layer 83.

The complex moduli determined above allow the outer layer 81, the interlayer 82, and the inner layer 83 to work as reinforcing rubbers having a substantially uniform hardness. Thus, reinforcing a space between the steel belt cord and the steel carcass cord can improve the durability. Moreover, the above-mentioned difference in loss tangent decreases, the internal loss in the interlayer 82, thereby reducing the rolling resistance.

The "substantially the same" means that the values of the complex modulus $E^*b$ and the complex modulus $E^*c$ are the same, or that a ratio of the larger complex modulus to the smaller complex modulus is not more than 1.5 when there is a magnitude relationship between them. It is always preferred that the complex modulus $E^*b$ and the complex modulus $E^*c$ are the same values. When there is a magnitude relationship between them, the ratio of the larger complex modulus to the smaller complex modulus is preferably not more than 1.4, more preferably not more than 1.3, much more preferably not more than 1.2, further more preferably not more than 1.1.

When the each loss tangent $\tan \delta b$ of the outer layer 81 and the inner layer 83 is small, the durability may possibly be improved insufficiently. When the loss tangent $\tan \delta b$ is large, the rolling resistance may possibly be improved insufficiently. From the viewpoint of this, the lower limit of the loss tangent $\tan \delta b$ is preferably not less than 0.035, more preferably not less than 0.038. The upper limit is not more than 0.045, more preferably not more than 0.042.

The loss tangent $\tan \delta c$ of the interlayer 82 is large, the rolling resistance possibly decreases. When the loss tangent $\tan \delta c$ is small, the durability possibly decreases. From the viewpoint of this, the upper limit of the loss tangent $\tan \delta c$ is preferably less than 0.035, more preferably not more than 0.030. The lower limit is not less than 0.020, more preferably not more than 0.025.

In order to be substantially the same value in complex modulus and to set the different values in loss tangent as mentioned the above, compared with the rubber composition B of the outer layer 81 and the inner layer 83, the rubber composition C of the interlayer 82 contains less filler (carbon black, silica and the like) for the rubber reinforcement and contains more sulfur. An amount of filler of the rubber composition C of the interlayer 82 is preferably in a range of less than 35 phr; an amount of filler of the rubber composition B of the outer layer 81 and the inner layer 83 is preferably in a range of from 35 to 45 phr; and a difference between the amounts of filler (=the amount of filler of the rubber composition B−the amount of filler of the rubber composition C) is set to not less than 5 phr.

It is efficient to restrict the volumes of the rubber composition B and the rubber composition c in order to reduce effectively the rolling resistance. More particularly, as an area (area ratio) in the axially inner part, the rubber composition C of the interlayer 82 is preferably at least about 50% of the rubber composition B when the belt cushion 8 is divided into two parts: an axially inner part and an axially outer part, by a line extending from the tire-axis-direction end of the belt layer 7 in parallel to the tire-radial-direction in the tire meridian section. Therefore, in the present embodiment, the rubber composition C is set in a range of from 40% to 60% of the rubber composition B.

For a similar cause, the respective thicknesses measured along the normal line N, the following relations in thickness are preferably formed:

interlayer 82>inner layer 83 and interlayer 82>outer layer 81.

As shown in FIG. 2, the belt cushion 8 may be provided additionally inside the inner layer 83 with an innermost layer 84 to improve adhesiveness between the inner layer 83 and the topping rubber of the carcass 6.

The innermost layer 84 is a layer having a substantially constant thickness, which is the thinnest in the belt cushion 8. The innermost layer 84 is preferably disposed to cover over the inner surface of the inner layer 83 in order to prevent directly-contacting of the inner layer 83 with the steel cord of the carcass 6 and its topping rubber. The innermost layer 84 is made of a sheet of the rubber composition D.

The rubber composition D contains a rubber component anchored by natural rubber (NR) and additionally contains cobalt in order to improve adhesiveness of the steel carcass cord and the topping rubber anchored by butyl rubber. This helps to prevent effectively a separation between the belt cushion 8 and the carcass 6 and to improve durability of the shoulder portion. The rubber composition D preferably contains cobalt of from 0.5 to 5.0 parts by mass with respect to rubber component 100 parts by mass.

The base rubber 2GB preferably terminates on the interlayer 82 in the axially outer surface of the belt cushion 8, and the cap rubber 2GC preferably terminates on the inner layer 83. Therefore, the tread rubber 2G has a smaller rigidity difference between the rubbers adjacent each other at the end portion. The base rubber 2GB has an advantage in the rubber adhesiveness of the rubbers, furthermore the durability.

In the viewpoint of the low-fuel consumption, the complex modulus of the base rubber 2GB is preferably set in a range of from 3.0 to 5.0 MPa, and the loss tangent is preferably set in a range of from 0.030 to 0.050; and the complex modulus of the cap rubber 2GC is preferably in a range of from 4.5 to 5.5 MPa, and the loss tangent is preferably set in a range of from 0.05 to 0.08.

An example of a method for manufacturing the belt cushion 8 will be explained below.

The belt cushion 8 may be formed by extruding the interlayer 82 by use of a rubber extruder, for example, so as to form a substantially triangular shape in cross-section. On the inside and outside thereof, adhered are the sheet-like inner layer 83 and the outer layer 81 formed by calendar rollers to have a predetermined thickness.

As another method for manufacturing the belt cushion 8, there is a so-called strip winding method to form it by winding a narrow rubber tape a number of times; the respective layers are wound sequentially around the carcass ply wound over on a tire drum cylindrically or around the carcass ply formed toroidal shape, for example.

Hereinbefore, the especially preferred embodiments of the present invention were described, but it will be obvious that various changes may be made without limitation to what was described in the embodiments.

For example, in the belt cushion 8 according to the present embodiment, the outer layer 81 may be continuous with the inner layer 83 at the axially inner end thereof, and the continuous part may be the a single layer made of only the rubber composition B; however, the belt cushion 8 may be also formed by dividing the interlayer 82 without connection between the outer layer 81 and the inner layer 83.

Embodiment

Pneumatic tire for heavy loads having a basic structure shown in FIG. 1 and comprising a belt cushion shown in Table 1 were manufactured, and its properties were evaluated. The tires had the same specifications as follows:

Tire size: 11R22.5 14PR
Rim size: 7.50×22.5
Carcass:
  Cord diameter of carcass ply: 0.85 mm
Belt layer:
  Cord diameter of belt cord: 1.15 mm
  Cord of first belt ply:
    Inclination direction with respect to tire equator: Right
    Angle with respect to tire equator: 50 degrees
  Cord of second belt ply:
    Inclination direction with respect to tire equator: Right
    Angle with respect to tire equator: 18 degrees
  Cord of third belt ply:
    Inclination direction with respect to tire equator: Left
    Angle with respect to tire equator: 18 degrees
  Cord of fourth belt ply:
    Inclination direction with respect to tire equator: Left
    Angle with respect to tire equator: 18 degrees Outer and inner layers were based on a compound 1, and an interlayer was based on a compound 2 shown in Table 2. The respective complex modulus E*b, complex modulus E*C, tan δb, tan δc were adjusted by changing quantity of carbon, sulfur, and vulcanization accelerator. An edge cover was based on a compound 3, and an innermost layer was based on a compound 4.

The details are as follows:
  Natural rubber (NR): RSS#3
  Butadiene rubber (BR): BR150B manufactured by UBE INDUSTRIES, LTD.
  Carbon: SHOBLACK N220 manufactured by Cabot Corporation
  Process oil: Mineral oil PW-380 manufactured by Idemitsu Kosan Co., Ltd.
  Rubber antioxidant resistor 6C:
Antigen 6C (N-(1,3-Dimethylbutyl)-N'-phenyl-p-phenylenediamine) manufactured by Sumitomo Chemical Co., Ltd.
  Paraffin wax: Sunnoc wax manufactured by OUCHI SHINKO CHEMICAL INDUSTRIAL CO., LTD.
  Stearic acid: Tsubaki manufactured by NOF CORPORATION Zinc oxide: Zinc oxide 1 manufactured by MITSUI MINING & SMELTING CO., LTD.
  Sulfur: Powder sulfur manufactured by Karuizawa Sulfur KK
  Vulcanization accelerator: Nocceler NS
(N-tert-Butyl-2-benzothiazolesulfenamide) manufactured by OUCHI SHINKO CHEMICAL INDUSTRIAL CO., LTD.

Test method was as follows.

<Rolling Resistance>

Each test tire was mounted on the above-mentioned rim having an internal pressure of 750 kPa and a vertical load of 24.51 kN, and was rolled on a drum-type tire rolling resistance tester to measure the rolling resistance. Evaluation was displayed using indices with Example 1 being 100. The smaller the numeric value was, the smaller the rolling resistance was; and the less the fuel consumption was.

<Durability>

Each test tire was mounted on the rim having an internal pressure of 750 kPa and applied on a route truck 2D4-typed tire geometry, and the truck ran actually under the same running condition during six months. After the actual running, the tire was demolished to measure adhering power between a belt cushion and a carcass ply and an adhering power between the belt layer and a belt cushion. Evaluation was displayed using indices with Example 1 being 100. The larger the numeric value was, the higher the adhering power was; and the more favorable it was. Meanwhile, the adhering power was measured as follows: a drag was measured when separating a rubber cord tension tester (Type: INTESCO2005; room air temperature: 20 degrees C.; humidity: 65%; tension at the speed of 50 mm/min). Test results were shown in Table 1.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Com. Ex. 1 | Com. Ex. 2 | Ex. 11 | Ex. 12 |
|---|---|---|---|---|---|---|---|---|---|---|---|---|---|---|
| Complex modulus E*b of outer layer and inner layer (MPa) | 2.9 | 2.6 | 3.0 | 2.9 | 2.1 | 3.5 | 2.9 | 2.9 | 2.9 | 2.9 | 2.5 | 1.7 | 2.9 | 2.9 |

TABLE 1-continued

| | Ex. 1 | Ex. 2 | Ex. 3 | Ex. 4 | Ex. 5 | Ex. 6 | Ex. 7 | Ex. 8 | Ex. 9 | Ex. 10 | Com. Ex. 1 | Com. Ex. 2 | Ex. 11 | Ex. 12 |
|---|---|---|---|---|---|---|---|---|---|---|---|---|---|---|
| Complex modulus E*c of interlayer (MPa) | 2.5 | 2.8 | 3.1 | 3.7 | 2.5 | 2.5 | 2.5 | 2.5 | 2.5 | 2.7 | 2.9 | 2.3 | 2.0 | 2.5 |
| tan δb of outer layer and inner layer | 0.042 | 0.038 | 0.044 | 0.042 | 0.030 | 0.050 | 0.042 | 0.042 | 0.042 | 0.042 | 0.027 | 0.025 | 0.042 | 0.042 |
| tan δc of interlayer | 0.027 | 0.030 | 0.033 | 0.040 | 0.027 | 0.027 | 0.027 | 0.027 | 0.027 | 0.029 | 0.042 | 0.025 | 0.022 | 0.027 |
| Thickness BC1 of outer layer (mm) | 2.88 | 1.73 | 3.68 | 2.88 | 2.88 | 2.88 | 0.92 | 4.37 | 2.88 | 2.88 | 2.88 | 2.88 | 2.88 | 2.88 |
| Ratio (BC1/cord diameter of belt cord) | 2.5 | 1.5 | 3.2 | 2.5 | 2.5 | 2.5 | 0.8 | 3.8 | 2.5 | 2.5 | 2.5 | 2.5 | 2.5 | 2.5 |
| Thickness BC2 of inner layer (mm) | 2.13 | 1.23 | 3.40 | 2.13 | 2.13 | 2.13 | 2.13 | 2.13 | 0.85 | 3.83 | 2.13 | 2.13 | 3.83 | 5.10 |
| Ratio (BC2/cord diameter of carcass ply) | 2.5 | 1.5 | 4.0 | 2.5 | 2.5 | 2.5 | 2.5 | 2.5 | 1.0 | 4.5 | 2.5 | 2.5 | 4.5 | 6.0 |
| Rolling resistance (index) [Smaller is better.] | 100 | 98 | 105 | 110 | 95 | 105 | 98 | 103 | 98 | 103 | 107 | 105 | 103 | 105 |
| Durability (index) [Larger is better.] | 100 | 96 | 103 | 105 | 90 | 103 | 93 | 103 | 93 | 103 | 90 | 85 | 103 | 110 |

TABLE 2

| | Compound 1 | Compound 2 | Compound 3 | Compound 4 |
|---|---|---|---|---|
| NR | 100.0 | 100.0 | 100.0 | 100.0 |
| Carbon | 25.0 | 25.0 | 65.0 | 60.0 |
| Process oil | — | — | 2.0 | 2.0 |
| Rubber antioxidant 6C | 3.0 | 3.0 | 2.0 | 2.0 |
| Paraffin wax | 2.0 | 2.0 | — | — |
| Stearic acid | 3.0 | 3.0 | — | — |
| Zinc oxide | 3.0 | 3.0 | 8.0 | 6.0 |
| Sulfur | 2.5 | 3.0 | 5.5 | 5.5 |
| Vulcanization accelerator | 1.5 | 1.5 | 1.0 | 1.0 |
| Silica | 15.0 | 10.0 | — | — |
| Silica coupling agents | 1.0 | 1.0 | — | — |

* Composition unit: parts by mass

For the test result, it was confirmed that the fuel consumption and the durability were improved in the tire according to the embodiment.

EXPLANATION OF REFERENCE

1 Pneumatic tire for heavy load
2 Tread portion
3 Sidewall portion
4 Bead portion
5 Bead core
6 Carcass
6A Carcass ply
7 Belt layer
7A, 7B, 7C, and 7D Belt ply
8 Belt cushion
81 Outer layer
82 Interlayer
83 Inner layer

The invention claimed is:

1. A pneumatic tire for heavy load comprising:
   a carcass extending from a tread portion through a sidewall portion to a bead portion;
   a belt layer disposed on the radially outside of the carcass and inside the tread portion; and
   a belt cushion disposed between the tire-axis-direction end of the belt layer and said carcass,
   wherein
   said tire-axis-direction end of said belt layer is covered with an edge cover made of a rubber composition A and said belt cushion comprises four layers including an outer layer, an interlayer, an inner layer, and an innermost layer, which are arranged in this order inwardly in the tire-radial-direction from the tire-axis-direction end of said belt layer, said outer layer and said inner layer are made of a rubber composition B having complex modulus E*b and loss tangent tan δb, said interlayer is made of a rubber composition C having complex modulus E*c being substantially the same as said complex modulus E*b and having loss tangent tan δc being smaller than said loss tangent tan δb, and said innermost layer is made of a rubber composition D and is disposed between said inner layer and said carcass.

2. The pneumatic tire for heavy load as set forth in claim 1; wherein
   said rubber composition B of the outer layer and the inner layer includes rubber reinforcing filler ranging from 35 to 45 parts by mass with respect to rubber component 100 parts by mass, and loss tangent tan δb is in a range of from 0.035 to 0.045;

said rubber composition C of the interlayer includes rubber reinforcing filler of less than 35 parts by mass with respect to rubber component 100 parts by mass, and the loss tangent tan δc is less than 0.035; and a difference between the rubber reinforcing filler quantity of said rubber composition B and the rubber reinforcing filler quantity of said rubber composition C is not less than 5 parts by mass.

3. The pneumatic tire for heavy load as set forth in claim 1; wherein a thickness BC1 of said outer layer measured from the tire-axis-direction end of the belt layer toward the radially inside of the tire is in a range of from not less than 0.5 times to not more than 3.5 times the cord diameter of the cord of the belt ply, a thickness BC2 of said inner layer measured along the normal line extending from the tire-axis-direction end of the belt layer to the carcass is in a range of from not less than 1.0 times to not more than 6.0 times the cord diameter of the carcass cord of the carcass ply adjacent to the inner layer.

4. The pneumatic tire for heavy load as set forth in claim 2; wherein a thickness BC1 of said outer layer measured from the tire-axis-direction end of the belt layer toward the radially inside of the tire is in a range of from not less than 0.5 times to not more than 3.5 times the cord diameter of the cord of the belt ply, a thickness BC2 of said inner layer measured along the normal line extending from the tire-axis-direction end of the belt layer to the carcass is in a range of from not less than 1.0 times to not more than 6.0 times the cord diameter of the carcass cord of the carcass ply adjacent to the inner layer.

* * * * *